(12) United States Patent
Dunn et al.

(10) Patent No.: US 11,649,042 B2
(45) Date of Patent: May 16, 2023

(54) COLLAPSIBLE SPAR MANDREL

(71) Applicant: LOCKHEED MARTIN CORPORATION, Bethesda, MD (US)

(72) Inventors: Eric Dunn, Trumbull, CT (US); Keith M. Schenone, Fairfield, CT (US); Sven R. Lofstrom, Irving, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 198 days.

(21) Appl. No.: 16/928,453

(22) Filed: Jul. 14, 2020

(65) Prior Publication Data
US 2022/0017215 A1 Jan. 20, 2022

(51) Int. Cl.
| | | |
|---|---|---|
| *B64C 27/06* | (2006.01) |
| *B29C 33/48* | (2006.01) |
| *B29D 99/00* | (2010.01) |
| *B29C 53/82* | (2006.01) |
| *B33Y 80/00* | (2015.01) |
| *B33Y 10/00* | (2015.01) |

(52) U.S. Cl.
CPC ............ *B64C 27/06* (2013.01); *B29C 33/485* (2013.01); *B29C 53/824* (2013.01); *B29D 99/0028* (2013.01); *B33Y 10/00* (2014.12); *B33Y 80/00* (2014.12)

(58) Field of Classification Search
None
See application file for complete search history.

(56) References Cited

U.S. PATENT DOCUMENTS

| | | |
|---|---|---|
| 9,802,365 B2 | 10/2017 | Fraidenburgh |
| 10,464,656 B2 | 11/2019 | Stewart |
| 2016/0339661 A1 | 11/2016 | Jones et al. |
| 2017/0072598 A1* | 3/2017 | Tessier ................ B29C 33/3807 |

* cited by examiner

*Primary Examiner* — Barbara J Musser
(74) *Attorney, Agent, or Firm* — Foley & Lardner LLP

(57) ABSTRACT

According to an aspect, a method of assembling a mandrel includes assembling a plurality of members via interlocking features arranged at opposing edges of each member of the plurality of members to form a compartment, the assembled members having a collective outer surface that conforms to an inner surface of the spar. A support member is inserted into the compartment formed radially inward from the assembled members, the support member making contact with a portion of each member of the plurality of members.

12 Claims, 7 Drawing Sheets

COLLAPSIBLE SPAR MANDREL

STATEMENT OF FEDERAL SUPPORT

This invention was made with government support under W911W6-19-9-0005 awarded by the US Army. The government has certain rights in the invention.

BACKGROUND

Exemplary embodiments of the invention generally relate to a hollow composite member for a rotary wing aircraft, and more particularly, to the process and apparatus used to manufacture the composite rotor blades of a rotary wing aircraft.

Rotor blades typically include a spar that extends from the root of the rotor blade to its tip. The spar is a major structural element of the rotor blade that provides the blade with the structural strength needed to carry high operational loads. The typical rotor blade spar is a long tubular structure around which the rest of the blade is formed. The spar tube has an elliptical cross-section that is formed to provide a forward or leading edge and rearward or trailing edge. In order to provide optimum aerodynamic performance, many spar tubes include a slight twist about the longitudinal axis. Typical twists in the spar provide rotations of the elliptical cross-section of up to 10 degrees and more from the root of the rotor blade to its tip.

The typical composite spar is fabricated by applying an uncured composite material to the surface of a long cylindrical mold or mandrel that is shaped to provide the interior surface of the spar tube. After the composite material is applied to the mandrel, it is compacted and cured at an elevated temperature to provide the final spar structure. A problem associated with making composite spars revolves around how to fabricate a mandrel with specific exterior surface contours, and that is removable from a cavity of the spar. The length of the mold and the variations in the elliptical cross-section of the spar, as well as any twist in the spar, make it very difficult to remove the mandrel after the spar has cured.

BRIEF DESCRIPTION

According to an embodiment, a method of assembling a mandrel includes assembling a plurality of members via interlocking features arranged at opposing edges of each member of the plurality of members to form a compartment, the assembled members having a collective outer surface that conforms to an inner surface of the spar. A support member is inserted into the compartment formed radially inward from the assembled members, the support member making contact with a portion of each member of the plurality of members.

In addition to one or more of the features described above or below, or as an alternative, each interlocking feature comprises a respective tongue portion and groove portion.

In addition to one or more of the features described above or below, or as an alternative, assembling the plurality of members includes inserting a respective tongue portion of each member of the plurality of members into a respective groove portion of another member of the plurality of members.

In addition to one or more of the features described above or below, or as an alternative, the support member includes a plurality of vanes extending radially outwardly from a center of the support member.

In addition to one or more of the features described above or below, or as an alternative, the support member has a number of vanes equal to a number of members of the plurality of members.

In addition to one or more of the features described above or below, or as an alternative, inserting the support member into the compartment includes sliding a respective edge of each vane into a respective groove of each member of the plurality of members.

In addition to one or more of the features described above or below, or as an alternative, the method further includes coupling a first sub-member to a second sub-member to form a member of the plurality of members.

In addition to one or more of the features described above or below, or as an alternative, the method further includes inserting the assembled mandrel into a spar cavity of an uncured spar. Then removing, in response to the spar being cured, the support member from the compartment. Then removing, upon removal of the support member, the assembled mandrel from the spar cavity.

In addition to one or more of the features described above or below, or as an alternative, removing the support member includes sliding the support member out of the assembled mandrel.

In addition to one or more of the features described above or below, or as an alternative, the method further includes applying a pressure to an outer surface of the uncured spar while the mandrel is inserted in the spar cavity.

In addition to one or more of the features described above or below, or as an alternative, removing the assembled mandrel includes sliding a single member of the plurality of members out of the spar cavity prior to removing a balance of the plurality of members.

In addition to one or more of the features described above or below, or as an alternative, each member of the plurality of members is fabricated through an additive manufacturing process.

In addition to one or more of the features described above or below, or as an alternative, the method further includes generating a computer-model of the surface of the spar, determining a number of members of the plurality of members on the computer-model, defining a model member for each of the determined number of members, and additively manufacturing each of the members according to the defined model member.

In addition to one or more of the features described above or below, or as an alternative, a first member of the plurality of members has a surface profile that conforms to a leading edge surface of the spar; and a second member of the plurality of members has a surface profile that conforms to a trailing edge surface of the spar.

According to another embodiment, a mandrel assembly includes a first member having a first surface contour that conforms to a first portion of the spar surface, the first member including respective interlocking features at opposing edges, a second member having a first surface contour that conforms to a second portion of the spar surface, the second member including respective interlocking features at opposing edges, a third member having a first surface contour that conforms to a third portion of the spar surface, the third member including respective interlocking features at opposing edges to interlock with the respective interlocking features of the first and second members, a fourth member having a first surface contour that conforms to a balance of the spar surface, the fourth member including respective interlocking features at opposing edges to interlock with the respective interlocking features of the first and second members, and a support member having a plurality of vanes that extend outwardly, each vane having an end insertable into a respective groove of each of the first member, second member, third member, and fourth member, whereby the interlocking features are configured to interconnect the first through fourth members to permit the mandrel to remain assembled without the support member.

In addition to one or more of the features described above or below, or as an alternative, the interlocking features include a respective tongue portion and groove portion.

In addition to one or more of the features described above or below, or as an alternative, the support member further includes a planar base having a contour matching a contour of the compartment.

In addition to one or more of the features described above or below, or as an alternative, the support member includes four vanes.

In addition to one or more of the features described above or below, or as an alternative, the four vanes are arranged in a cross pattern.

In addition to one or more of the features described above or below, or as an alternative, the first surface contour of the first member conforms to a surface contour of a leading edge of a spar.

In addition to one or more of the features described above or below, or as an alternative, the first surface contour of the second member conforms to a surface contour of a trailing edge of a spar.

The detailed description explains embodiments of the invention, together with advantages and features, by way of example with reference to the drawings.

A detailed description of one or more embodiments of the disclosed apparatus and method are presented herein by way of exemplification and not limitation with reference to the Figures.

DETAILED DESCRIPTION

A detailed description of one or more embodiments of the disclosed apparatus and method are presented herein by way of exemplification and not limitation with reference to the Figures.

Figure 1:
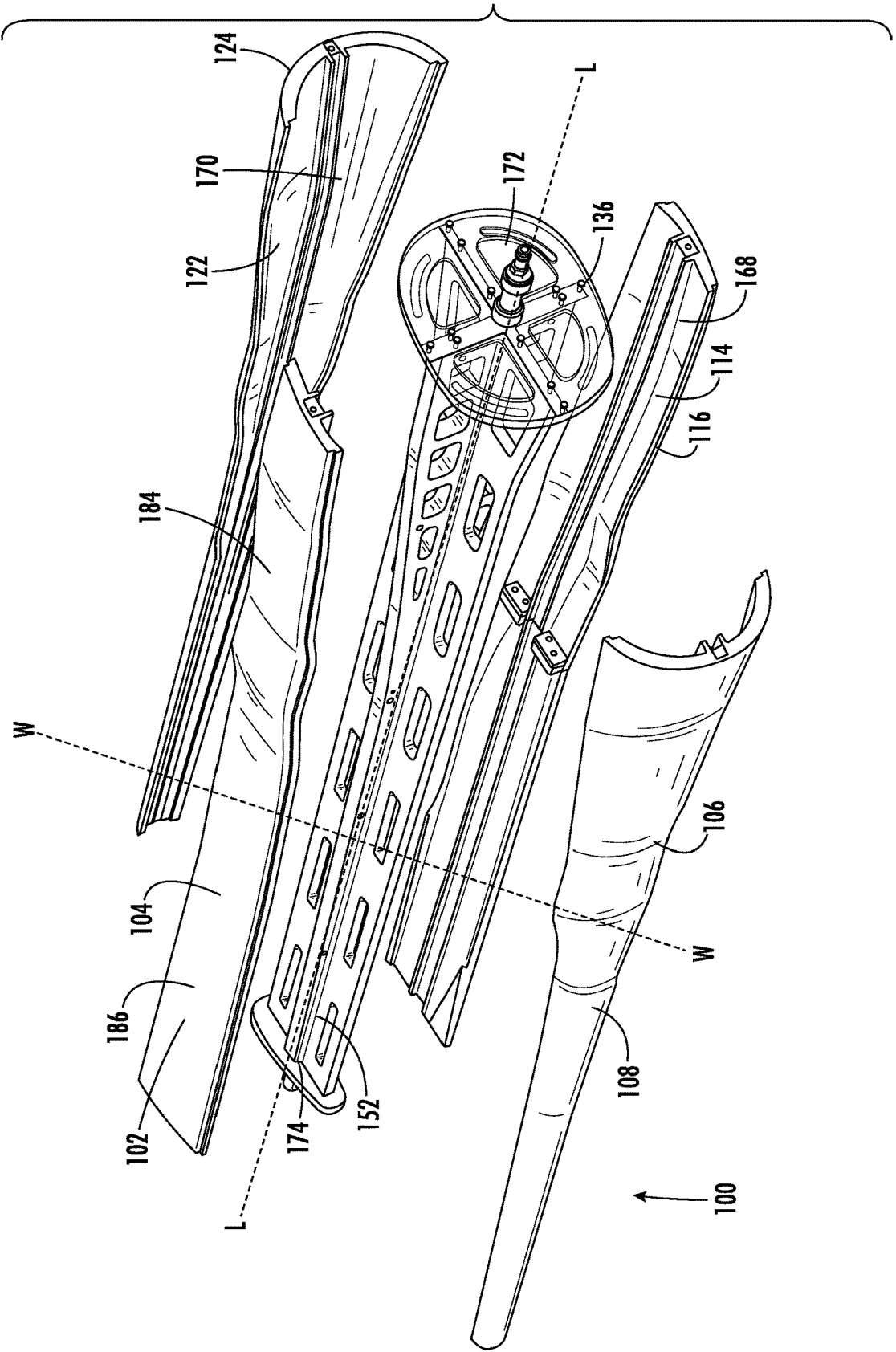
FIG. 1 is an exploded view of a mandrel according to an embodiment of the invention.
Figure 2:
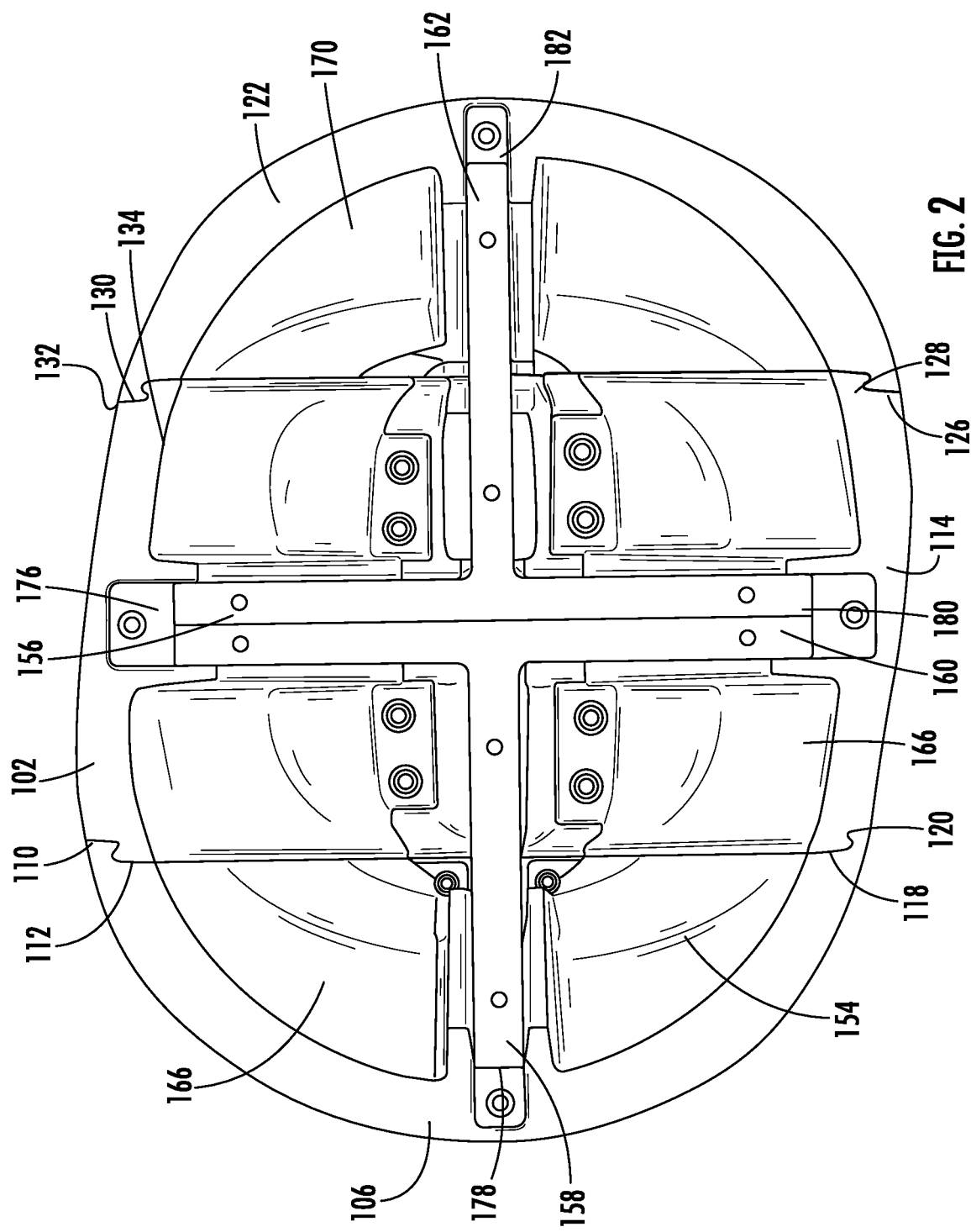
FIG. 2 is a cross-sectional view of a mandrel according to an embodiment of the invention.
Figure 3:
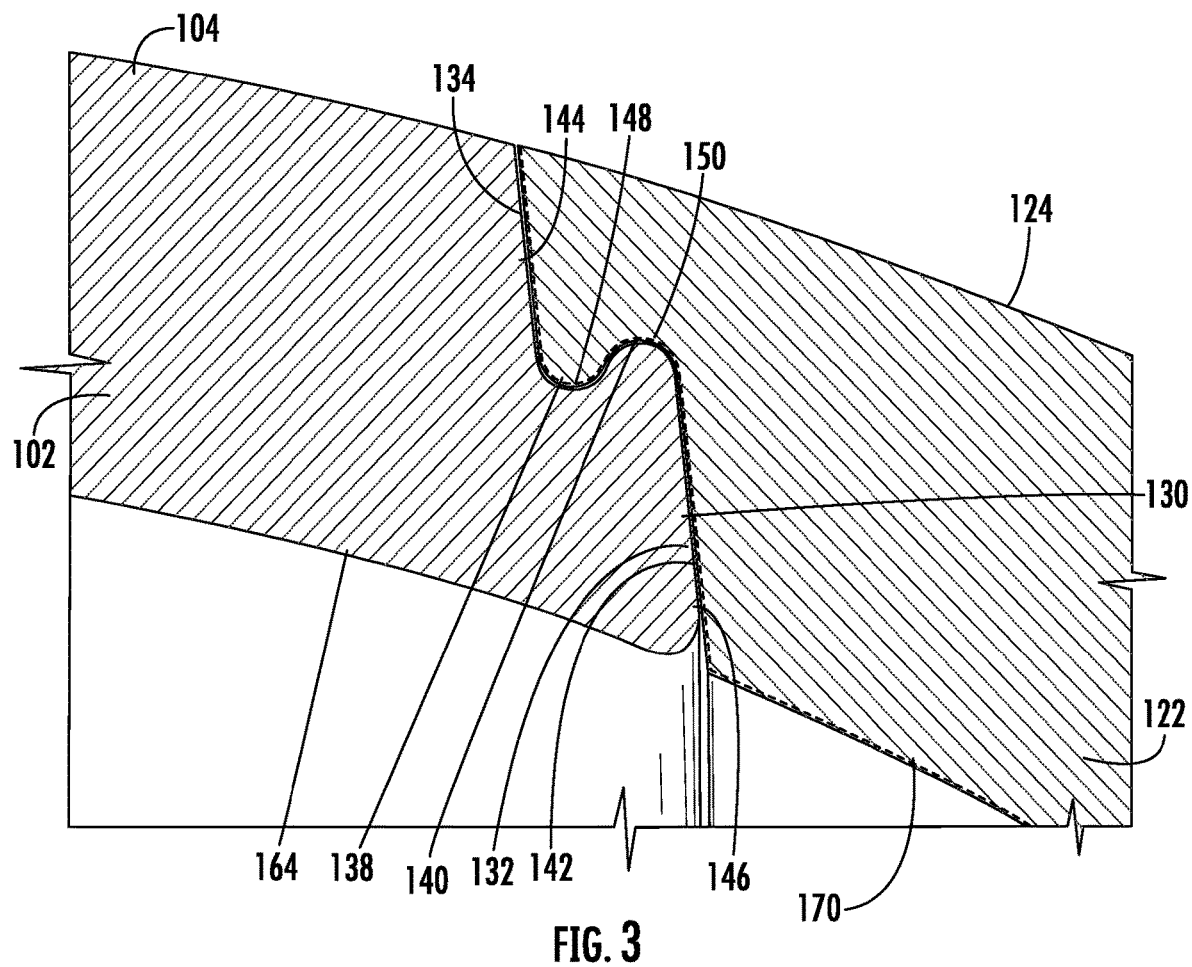
FIG. 3 is a cross-sectional view of a mandrel member interfacing with another mandrel member according to an embodiment of the invention.

Referring to FIG. 1-3, a mandrel 100 is shown. As seen, a plurality of members may be assembled to form a mandrel that has a shape that conforms to an exterior surface of a spar 302. As illustrated, the mandrel 100 includes an upper member 102 that has an exterior surface 104 shaped to form a portion of an upper surface of the spar 302. The upper member 102 further includes an interior surface 164 defining a first portion of an open compartment 154. The upper member 102 is configured to be arranged adjacent to a leading edge member 106 that has an exterior surface 108 shaped to form a portion of a leading edge surface of the spar 302. The leading edge member 106 further includes an interior surface 166 defining a second portion of the open compartment 154. A first side 110 of the upper member 102 is configured to interface with an adjacent side 112 of the leading edge member 106. The leading edge member 106 is configured to be arranged adjacent to a lower member 114 that has an exterior surface 116 shaped to form a portion of a lower surface of the spar 302. The lower member 114 further includes an interior surface 168 defining a third portion of the open compartment 154. A first side 118 of the leading edge member 106 is configured to interface with an adjacent side 120 of the lower member 114. The lower member 114 is configured to be arranged adjacent to a trailing edge member 122 that has an exterior surface 124 shaped to form a portion of a trailing edge surface of the spar 302. The trailing edge member 122 further includes an interior surface 170 defining a balance of the open compartment 154. A first side 126 of the lower member 114 is configured to interface with an adjacent side 128 of the trailing edge member 122. A first side 130 of the trailing edge member 122 is configured to interface with an adjacent side 132 of the upper member 102.

FIG. 3 illustrates an exemplary coupling between an interlocking feature of the upper member 102 and an interlocking feature of the trailing edge member 122. A first side 130 of the trailing edge member 122 is arranged opposite to the adjacent side 132 of the upper member 102 such that the first side 130 is flush with the adjacent side 132. The adjacent side 132 of the upper member 102 includes a first surface 134 that extends at an angle from the exterior surface 104 of the upper member 102 toward an interior surface 164 of the upper member 102 and ends at a groove portion 138. The groove portion 138 is connected at one end to the first surface 134 and to a tongue portion 140 at an opposite end. The cross-sectional contours of the groove portion 138 and the adjacent tongue portion 140 form an s-shaped pattern. The tongue portion 140 is connected at one end to the groove portion 138 and is connected to a second surface 142 at an opposite end. The second surface 142 extends from the opposite end of the tongue portion 140 to the interior surface 164 of the upper member 102.

The first side 130 of the trailing edge member 122 includes a first surface 144 that extends at an angle from the exterior surface 124 of the trailing edge member 122 toward the interior surface 170 of the trailing edge member 122 and ends at a tongue portion 148. The tongue portion 148 is connected at one end to the first surface 144 and to a groove portion 150 at an opposite end. The cross-sectional contours of the tongue portion 148 and the adjacent groove portion 150 form an s-shaped pattern similar to the s-shaped pattern of the groove portion 138 and the adjacent tongue portion 140 of the upper member 102. The groove portion 150 is connected at one end to the tongue portion 148 and is connected to a second surface 146 at an opposite end. The second surface 146 extends from the opposite end of the groove portion 150 to the interior surface 170 of the trailing edge member 122.

As seen in FIG. 3, the tongue portion 148 of the trailing edge member 122 rests against the groove portion 138 of the upper member 102 when the tongue portion 148 of the trailing edge member 122 is fully inserted into the groove portion 138 of the upper member 102. Additionally, the tongue portion 140 of the upper member 102 is arranged against the groove portion 150 of the trailing edge member 122 when the tongue portion 140 of the upper member 102 is fully inserted into the groove portion 150 of the trailing edge member 122. It is appreciated that while FIG. 3 only illustrates an interlocking of the upper member 102 and trailing edge member 122 the above-described s-shaped interconnect may be applied to any of the mandrel members 102 106 114 122. As assembled, the upper member 102 interlocks with the leading edge member 106 and the trailing edge member 122. The leading edge member 106 interlocks with the upper member 102 and the lower member 114. The lower member 114 interlocks with the leading edge member 106 and the trailing edge member 122. The trailing edge member 122 interlocks with the upper member 102 and the lower member 114. As assembled, the mandrel members 102 106 114 122 require no external support in order to remain in an assembled position. While shown with a particular number and shape of members, it is understood that the number and shape of the components is not specifically limited to the shown numbers and shapes.

As seen in FIGS. 1 and 2, a support member 152 is configured to be arranged inward from the open compartment 154 defined by an assembled upper member 102, leading edge member 106, lower member 114 and trailing edge member 122. An exemplary embodiment of the support member 152 is illustrated in FIGS. 1 and 2. The support member 152 includes a first vane 156, a second vane 158, a third vane 160, and a fourth vane 162. The first vane 156 extends radially outwardly toward a first groove 176 of the upper member 102. The second vane 158 extends radially outwardly toward a second groove 178 of the leading edge member 106. The third vane 160 extends radially outwardly toward a third groove 180 of the lower member 114. The fourth vane 162 extends radially outwardly toward a fourth groove 182 of the trailing edge member 122. Each vane 156 158 160 162 extends from a base 172 to a tip 174 along a longitudinal axis L of the support member 152. A surface contour of each groove 176 178 180 182 complements a surface of a tip of each vane 156 158 160 162. Each groove 176 178 180 182 extends from the base 172 to the tip 174 along the longitudinal axis L, such that the support member 152 is slidable into and out of the mandrel 100 along the grooves 176 178 180 182. The base 172 may include a generally planar structure connected at a proximal end of the support member 152. A contour 136 of the base 172 may conform to a contour of an opening the open compartment 154 at the proximal end. The tip 174 may also include a generally planar structure connected at a distal end of the support member 152. A contour of the tip 174 may conform to a contour of an opening the open compartment 154 at the distal end. As the support member 152 is inserted into the mandrel, it provides structural support for the mandrel 100. It is appreciated that although the Figures illustrate four mandrel members 102 106 114 122 and a support member 152 that includes four vanes 156 158 160 162, a mandrel 100 may be comprised of two or more members that may be assembled to form the mandrel 100. Furthermore, a number of vanes of the support member 152 may be based on a number of mandrel members or a desired level of structural support for the mandrel 100.

In some other embodiments, each mandrel member 102 106 114 122 is further divided into sub-members at a point along the longitudinal axis L. As illustrated FIG. 1, the upper member 102 may further be sub-divided into a distal member 184 and a proximal member 186. The distal member 184 may be coupled to the proximal member 186 at any point along the longitudinal axis L. The coupling may be similar to the coupling between a vane 156 158 160 162 of the support member 152 and a mandrel member 102 106 114 122, the interaction between mandrel members 102 106 114 122, or other appropriate interaction permissible to allow a plurality of sub-members to be assembled into a member 102 106 114 122. It should be appreciated that each mandrel member 102 106 114 122 may be subdivided into two or more sub-members, for example, a member can be further subdivided into three members such as a central member flanked on each side by a distal member and a proximal member.

The mandrel members 102 106 114 122 and their respective interfaces provide a means to remove the mandrel 100 upon completion of the spar lay-up. The support member 152 may be removed from the mandrel 100 by sliding the support member 152 out of the open compartment 154. Upon removal of the support member 152, the mandrel members 102 106 114 122 may be removed individually from the spar cavity 308.

Figure 4:
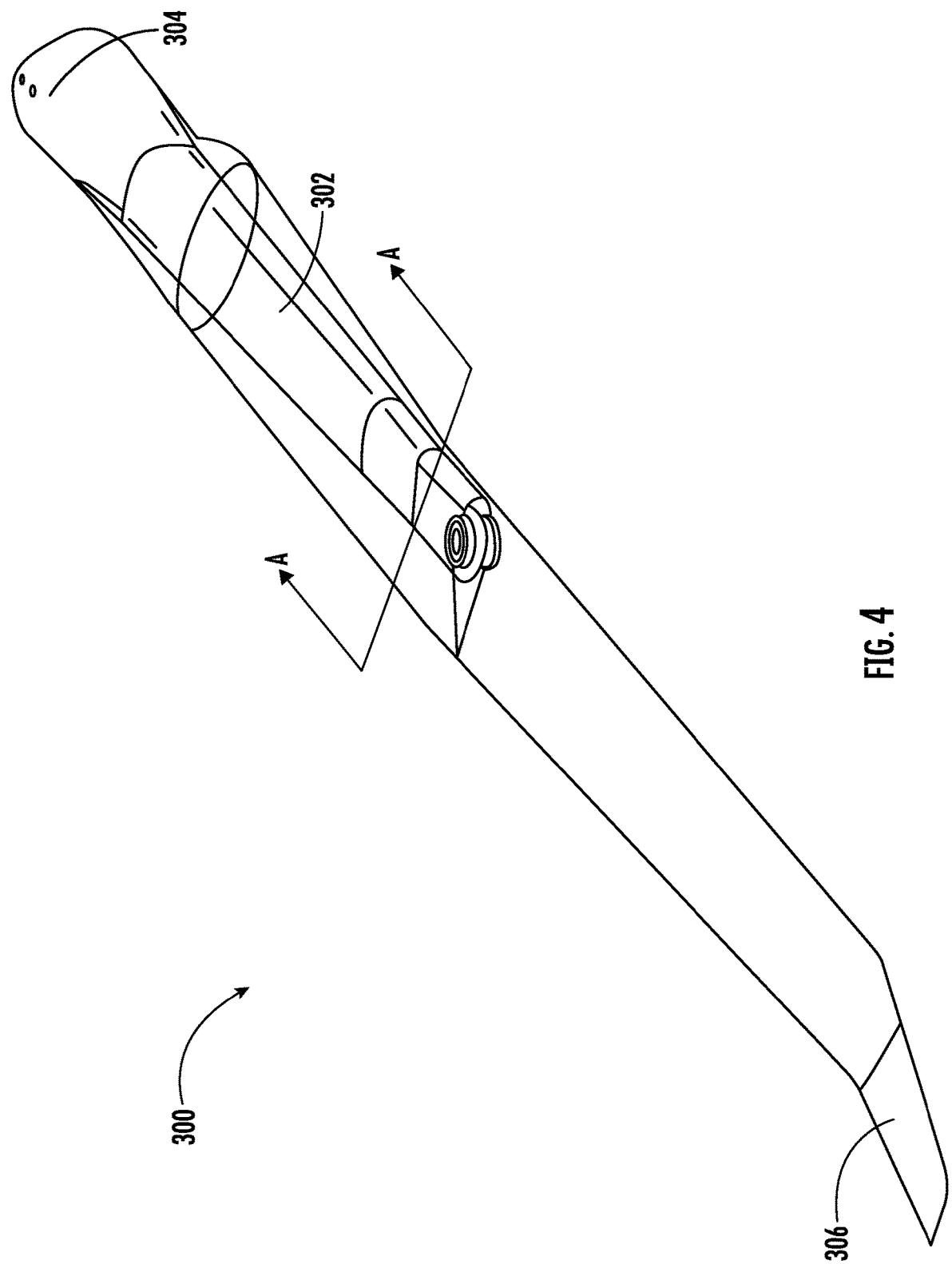
FIG. 4 is a perspective view of a rotor blade assembly of a rotor system of the rotary wing aircraft of FIG. 7.
Figure 5:
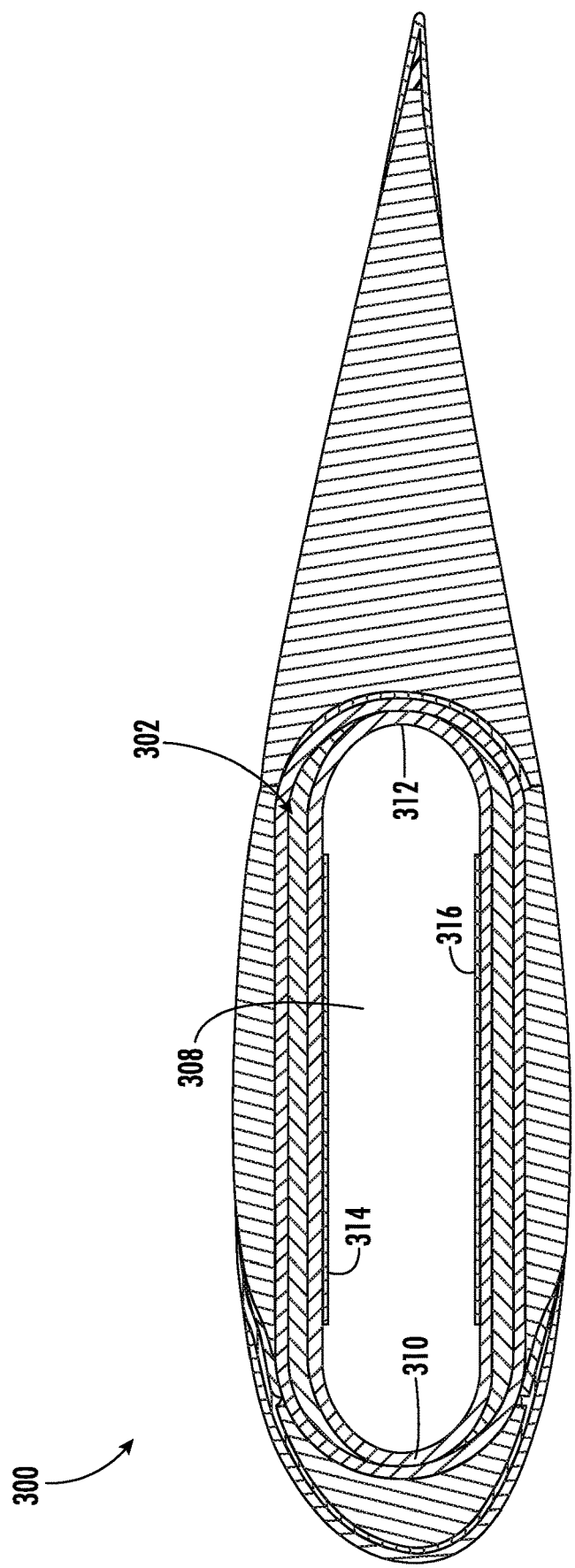
FIG. 5 is a cross-sectional view of the rotor blade assembly of FIG. 4 taken at line A-A.

Referring now to the exemplary rotor blade assembly 300 illustrated in FIGS. 4 and 5, a generally hollow, tubular spar 302 configured to couple to the rotor hub 20 at an inboard end 304 extends over at least a portion of the length of the rotor blade assembly 22. In one embodiment, the spar 302 may extend to the blade tip 306 of the rotor blade assembly 22. The cross-section of the spar 302 may vary in size and shape over the length of the spar 302 depending on the contour of the rotor blade assembly 22. Such changes can include reduced cross-sectional area, twists as a function of length, and/or turns to accommodate a swept portion of a blade. The spar 302, as shown in FIG. 4, includes a plurality of interior surfaces that define an interior spar cavity 308. The interior surfaces include an interior leading edge surface 310, an interior trailing edge surface 312, an interior upper surface 314, and an interior lower surface 316. Both the interior upper and lower surfaces 314, 316 extend opposite one another between the interior leading and trailing edge surfaces 310, 312. While shown with a tip 306 having a swept geometry, it is understood that the tip 306 need not have a swept geometry in all embodiments of the invention.

Figure 6:
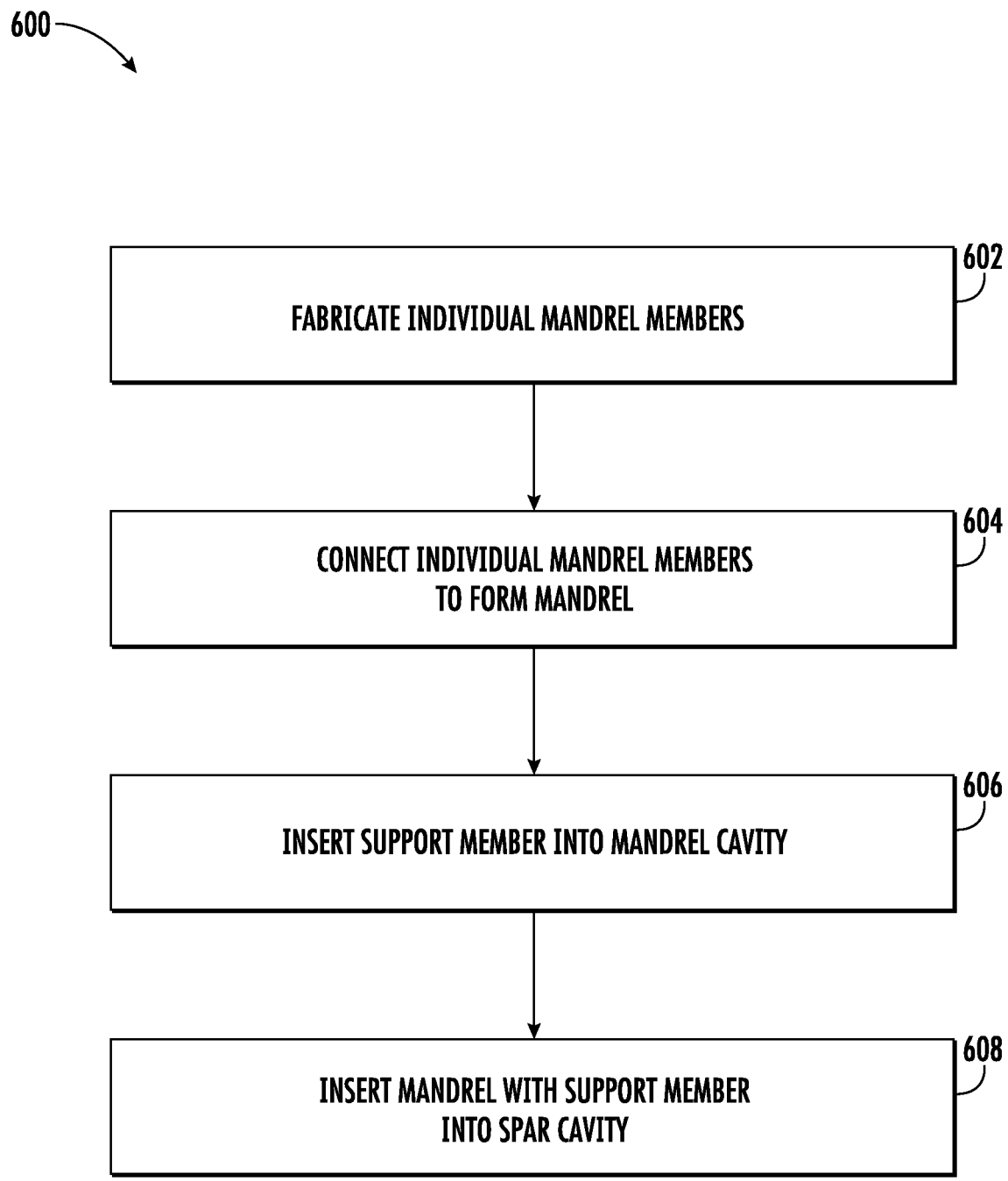
FIG. 6 is a schematic diagram of a method of constructing a mandrel according to another embodiment of the invention.

Referring to FIG. 6, a method 600 of assembling a mandrel 100 is shown. At block 602, each of the individual mandrel members 102 106 114 122 are formed. The number of mandrel members 102 106 114 122 may be based in part on an interior surface of the spar, or other appropriate consideration. The mandrel members 102 106 114 122 may be formed using various fabrication techniques.

In an exemplary embodiment, the mandrel members 102 106 114 122 are formed through additive manufacturing. Additive manufacturing may be utilized to fabricate three-dimensional (3D) mandrel members by adding layer-upon-layer of material until an individual mandrel member is formed. Additive manufacturing utilizes three-dimensional modeling (e.g., computer-aided design (CAD)) software, computer-controlled additive-manufacturing equipment, and raw materials in powder or liquid form. The modeling may be used to determine an optimal surface contour of a spar, and an optimal number of members. Additive manufacturing further includes a wide variety of technologies and incorporates a wide variety of techniques, for example, laser freeform manufacturing (LFM), laser deposition (LD), direct metal deposition (DMD), laser metal deposition, laser additive manufacturing, laser engineered net shaping (LENS), stereolithography (SLA), selective laser sintering (SLS), fused deposition modeling (FDM), multi-jet modeling (MJM), three-dimensional printing, rapid prototyping, direct digital manufacturing, layered manufacturing, and additive fabrication. Each member can respectively be defined by a respective model, prior to manufacturing. Each member can be additively manufactured separately. By applying computer modeling techniques and additive manufacturing, the members may be fabricated to conform to any desirable spar dimensions and to replace a member during a spar fabrication process as needed.

At block 604, the individual members 102 106 114 122 are coupled together to form the mandrel 100. For example, an upper member 102 may be coupled to a leading edge member 106. The leading edge member 106 may be coupled to a lower member 114. The lower member 114 may be arranged such that an inner surface of the lower member 114 faces an inner surface of the upper member 102. Furthermore, the lower member 114 may be coupled to a trailing edge member 122, and the trailing edge member 122 may be coupled back to the upper member 102. The trailing edge member 122 may be arranged such that an inner surface of the trailing edge member 122 faces an inner surface of the leading edge member 106.

At block 606, a support member 152 is inserted into the assembled mandrel. The support member, the upper member 102, leading edge member 106, lower member 114, and trailing edge member 122 may be configured to permit the support member 152 to slide into the assembled mandrel 100. For example, the support member 152 may include a plurality of vanes 156 158 160 162 and the assembled mandrel 100 may have a plurality of grooves 176 178 180 182. Each groove 176 178 180 182 may be arranged to receive a respective vane 156 158 160 162. The vanes 156 158 160 162 of the support member 152 may come into contact with the grooves 176 178 180 182 of the mandrel 100, such that the support member 152 adds to a resistive force created when an external force is applied to an exterior surface of the mandrel 100. At block 608, the assembled mandrel 100 is inserted into a cavity of an uncured spar. An external force is applied to the spar, causing the external surface contour of the spar to conform to the external surface contour of the mandrel. The mandrel 100 may then be removed after the spar is cured by reversing the process.

Figure 7:
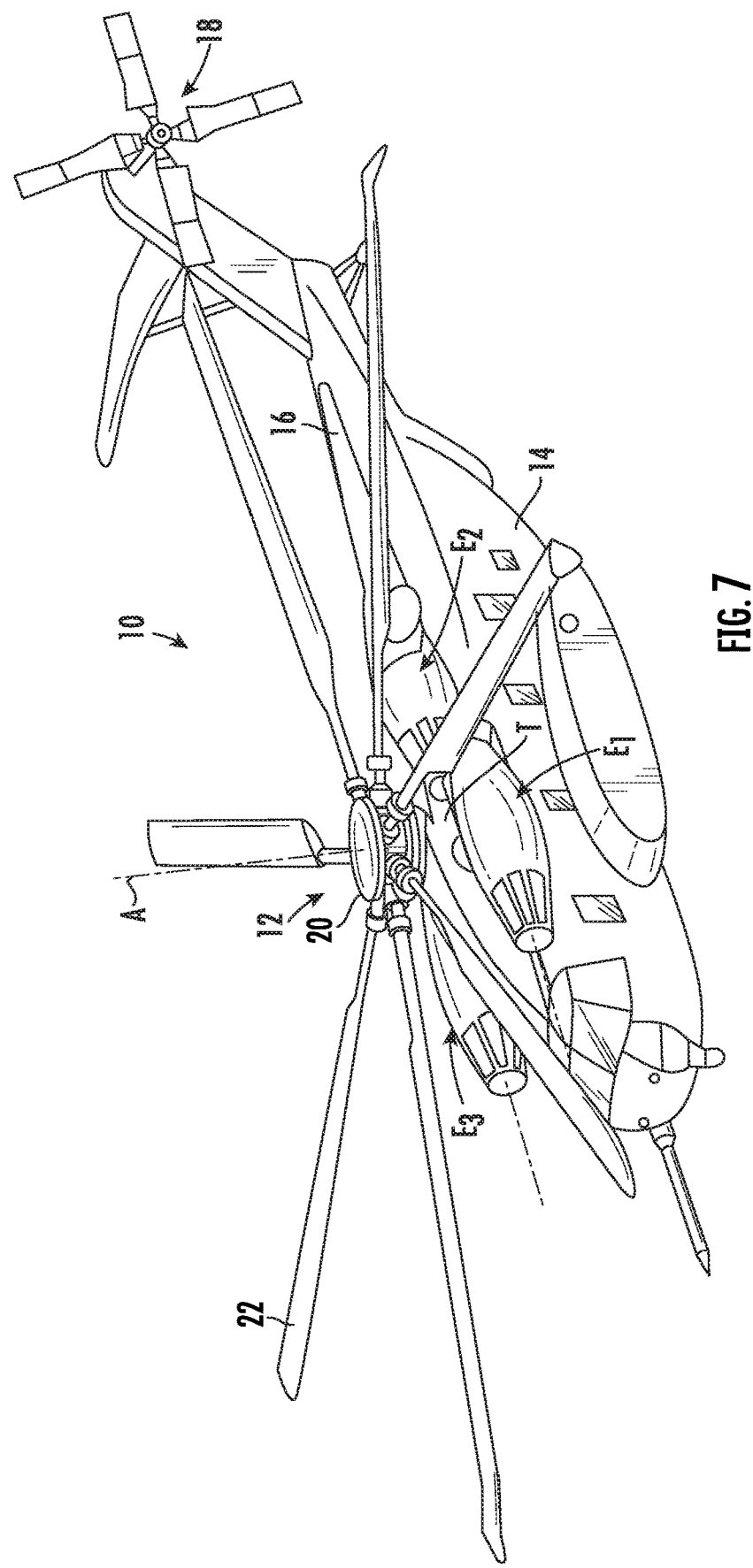
FIG. 7 is a perspective view of an example of a rotary wing aircraft.

FIG. 7 schematically illustrates a rotary-wing aircraft 10 having a main rotor system 12. The aircraft 10 includes an airframe 14 having an extending tail 16, which mounts a tail rotor system 18 as an anti-torque system. The main rotor assembly 12 is driven about an axis of rotation A through a main gearbox (illustrated schematically at T) by one or more engines E. The main rotor system 12 includes a rotor hub 20 having a plurality of rotor blade assemblies 22 mounted to and projecting radially outwardly therefrom. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of assembling a mandrel comprising:
   assembling a plurality of members via interlocking features arranged at opposing edges of each member of the plurality of members to form a compartment, the assembled members having a collective outer surface that conforms to an inner surface of the spar; and
   inserting a support member into the compartment formed radially inward from the assembled members, the support member making contact with a portion of each member of the plurality of members;
   wherein each of the plurality of members comprises a respective tongue portion and groove portion to form an s-shaped pattern, wherein the groove portion is connected to a first surface at a first end and to the tongue portion at a second end, and wherein the tongue portion is connected to a second surface at a third end and to the groove portion at the fourth end.

2. The method of claim 1, wherein each interlocking feature comprises the respective tongue portion and groove portion.

3. The method of claim 1, wherein assembling the plurality of members comprises:
   inserting the respective tongue portion of each member of the plurality of members into the respective groove portion of another member of the plurality of members.

4. The method of claim 1, wherein the support member comprises a plurality of vanes extending radially outwardly from a center of the support member.

5. The method of claim 4, wherein the support member has a number of vanes equal to a number of members of the plurality of members.

6. The method claim 5, wherein inserting the support member into the compartment comprises:
   sliding a respective edge of each vane into a respective groove of each member of the plurality of members.

7. The method of claim 1, further comprising:
   coupling a first sub-member to a second sub-member to form a member of the plurality of members.

8. The method of claim 1, further comprising:
   while the assembled mandrel is in a spar cavity of an uncured spar, sliding the support member out of the assembled mandrel; and
   removing, upon removal of the support member, the assembled mandrel from the spar cavity.

9. The method of claim 8, further comprising applying a pressure to an outer surface of the uncured spar while the mandrel is inserted in the spar cavity.

10. The method of claim 1, wherein a first member of the plurality of members has a surface profile that conforms to an inner surface of a leading edge surface of the spar; and wherein a second member of the plurality of members has a surface profile that conforms to an inner surface of a trailing edge surface of the spar.

11. A method of assembling a mandrel comprising:
   assembling a plurality of members via interlocking features arranged at opposing edges of each member of the plurality of members to form a compartment, the assembled members having a collective outer surface that conforms to an inner surface of the spar;
   inserting a support member into the compartment formed radially inward from the assembled members, the support member making contact with a portion of each member of the plurality of members;

coupling a first sub-member to a second sub-member to form a member of the plurality of members;
inserting the assembled mandrel into a spar cavity of an uncured spar; removing, in response to the spar being cured, the support member from the compartment and
removing, upon removal of the support member, the assembled mandrel from the spar cavity;
wherein removing the assembled mandrel comprises sliding a single member of the plurality of members out of the spar cavity prior to removing a balance of the plurality of members.

12. The method of claim 11, further comprising:
generating a computer-model of the surface of the spar;
determining a number of members of the plurality of members on the computer-model;
defining a model member for each of the determined number of members; and
additively manufacturing each of the members according to the defined model member.

* * * * *